United States Patent Office 3,356,443
Patented Dec. 5, 1967

3,356,443
MIXTURE OF NAPHTHOLAZOBENZENE AND NAPHTHOLAZOTOLUENE AND ITS PRODUCTION IN GRANULAR FORM
Alexander Dziomba, South Plainfield, N.J., assignor to American Cyanamid Company, Stamford, Conn., a corporation of Maine
No Drawing. Filed Apr. 1, 1964, Ser. No. 356,632
4 Claims. (Cl. 8—3)

ABSTRACT OF THE DISCLOSURE

Applicant's invention is a mixture of azonaphthol dyes, namely benzeneazonaphthol and a mixture of tolueneazonaphthols. Tarring of these dyes after synthesis by azo coupling of naphthol with aniline and mixed toluidines is averted by heating the mixture of dyes to 90°–102° C. and cooling rapidly to below 85° C. to obtain a granular orange dye mixture.

---

This invention relates to a granular oil-soluble orange dye and to a process for preparing the same. More particularly, it relates to a novel oil-soluble dye composition having properties which make it especially useful as a colorant for petroleum products, particularly gasoline.

Oil-soluble dyes have found wide application as colorants for gasoline and other petroleum products. To be suitable for such use, the dye products must meet certain requirements as to physical form, solubility, stability on exposure to heat and storage, lack of dustiness for handling, etc. Thus, in the commercial coloring of gasoline and fuel oil a dry eductor system is often used wherein a suitable probe is inserted into a container of dry dye and the dye is carried by an air stream into the probe and then into a tank or a moving stream of the petroleum products to be colored. It is essential that the dye be free of lumps, non-caking, and free-flowing. Since the dye is used and stored at a temperature which may reach as high as 65° C., it is necessary that the dye be free from caking at least up to 65° C. (and preferably at higher temperatures) to insure freedom from caking on long storage under adverse conditions.

In addition to the need for non-caking material, the dye should be dustless in order to prevent contamination of other materials in the plant and in order to protect workers from the dye since these materials present possible hazards.

In order to remain free flowing and dustless and yet have the prescribed rate of solution for use as a gasoline colorant the dye should exhibit a particle size distribution within the following limits: greater than 10 mesh, 5–30%; greater than 20 mesh, 50–70%; greater than 40 mesh, 10–25%; smaller than 40 mesh, less than 10%.

The products provided by this invention show approximately the following particle size distribution: retained on 10 mesh, 24±3%; on 20 mesh, 60±6%; on 40 mesh, 13±3%; through 40 mesh, 3±1%. The products of the present invention are, therefore, well within the required particle size distribution range.

Certain orange-colored azo dyes have been proposed as gasoline dyes, but attempts to prepare them in a granular, dustless, free-flowing form have not met with success. Two examples of such dyes are the azo dyes, I and II, below, derived from the coupling of beta-naphthol to aniline and to mixed toluidines (i.e. the natural mixture of isomers formed by nitrating toluene and reducing the nitro group), respectively.

I.

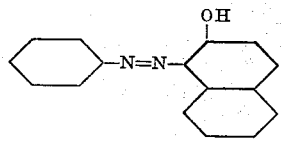

and

II.

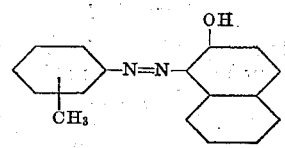

Thus, the orange azo dye derived from aniline diazo coupled into beta-naphthol (I) cannot be granulated. Instead, when such a dye is conditioned for granulation by methods successful with other dyes, no granulation results; instead a crystalline powder is obtained. On the other hand, when an attempt is made to granulate the azo dye derived from mixed toluidines diazo coupled into beta-naphthol (II) a tar forms instead of granules.

In accordance with the present invention, it has been found that the orange azo dye derived from the diazotization of a mixture of (a) aniline and (b) mixed toluidines (i.e., the natural mixture of isomers formed by nitrating toluene and reducing the nitro group) when coupled to beta-naphthol can be readily conditioned to produce granular orange dye having desirable properties as a gasoline colorant. Thus, the dye has the required granular form, it is dustless and it is non-caking at temperatures up to 85° C. It also possesses a high degree and rate of solubility in gasoline.

The mixture of aromatic amines used for the preparation of the diazo must contain the aniline and the mixed toluidines in certain proportions. Thus, on a mole percent basis, the mixture must contain no more than about 60% nor less than about 40% of aniline; and, conversely, no less than about 40% nor more than about 60% of mixed toluidines. Beyond these limits, the conditioning process to achieve granulation of the beta-naphthol coupled dye is ineffective.

It will be seen then that the dye compositions of the invention are mixtures of the following two compounds:

(1)

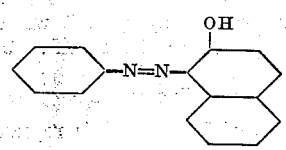

and (2)

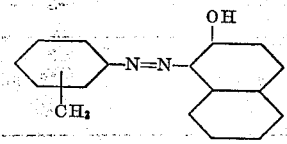

with the proportion of each compound in any such mixture being from about 40 to about 60 mole percent depending upon the proportions of aniline and mixed toluidines employed in the initial reaction, the total of the two compounds in said mixture always being 100%. Preferably, a 50/50 mole percent mixture of aniline and mixed toluidines is used to provide a product mixture comprised of 50 mole percent each of compounds (1) and (2).

The diazotization of the amine mixture is conducted in conventional fashion, such as reaction with sodium nitrite in acid solution at 0–5° C. The coupling reaction is also conducted under conventional conditions, i.e., at room temperature, employing a small excess of beta-naphthol (i.e. about 20% over the stoichiometrical amount of one mole per mole of aniline and mixed toluidines used in the reaction) and sufficient sodium hydroxide to dissolve the beta-naphthol and maintain the reaction mixture alkaline. When the coupling reaction is complete, the granular dye product is recovered by raising the temperature of the coupling mixture rapidly to above 90° C., preferably to 100–102° C. with agitation, and then up commencement of granulation, cooling the mixture quickly to below 85° C. preferably 80–85° C. The granules are then recovered by filtration.

The invention is further illustrated by the examples which follow:

Example 1

To 300 parts of water is added 65.6 parts of real sulfuric acid, 24.9 parts (0.26 M) of aniline and 28.6 parts (0.26 M) of mixed toluidines. The mixture is diluted to 530 parts at 0–5° C. After adding 12.3 parts of salt, ice is added to maintain the temperature at —2 to 0° C. and the mixture is then diazotized as fast as possible with 36.9 parts of real sodium nitrite at a 25% solution, adding it as fast as it is absorbed.

The above diazo mixture is then immediately coupled to beta-naphthol employing a beta-naphthol solution prepared by dissolving 80.9 parts (0.6 M) of beta-naphthol in 410 parts of water and 36.7 parts (0.9 M) of sodium hydroxide diluted to 1900 parts at 30° C. The coupling is effected by adding the diazo solution to the beta-naphthol solution over a 30-minute period at 20–30° C. the rate of addition being such that there is never an excess of diazo present. The mixture is then stirred for an additional 30 minutes to complete the coupling. The coupling mixture is heated rapidly to 100–102° C. with stirring. Then, upon commencement of granulation, it is quickly cooled to 80–85° C. by the addition of ice. The formed granulated material is then isolated by filtration, washed with water until free of alkali and then dried at 70–75° C.

A screening of the dried granular product shows the following particle size distribution.

| Screen size, mesh: | Percent retained |
|---|---|
| On 10 | 24.6 |
| On 20 | 59.2 |
| On 40 | 13.2 |
| Through 40 | 3.0 |

The dye is dustless and non-caking at temperatures up to 85° C. and exhibits excellent gasoline solubility. Thus when tested in Varsol (the standard solvent for rating the solubility of gasoline dyes) 99% was dissolved in 10 minutes, as compared to the specification regiment of 85%.

Example 2

The procedure of Example 1 is repeated except that the proportions of the amine starting materials are varied. The results are shown in the following table:

| Aniline, Mole percent | Mixed Toluidines, Mole percent | Result |
|---|---|---|
| 100 | 0 | Finely divided but no granulation. |
| 80 | 20 | No granulation. |
| 60 | 40 | Satisfactory granules. |
| 50 | ¹ 50 | Satisfactory granules. |
| 40 | 60 | Satisfactory granules. |
| 30 | 70 | Tar, large granules and lumps. |
| 0 | 100 | Tar forms. |

¹ Ex. 1.

As will be evident from the results shown in the table, satisfactory granulation is obtained only when the starting reaction mixture contains no more than 60, nor less than 40 mole percent aniline, and, conversely, no less than 40 and no more than 60 mole percent of the mixed toluidines.

Having now fully described the invention, what is claimed is:

1. A process for preparing a granular-form, oil-soluble orange dye which comprises the steps of (1) diazotizing a mixture composed of from about 60 to about 40 mole percent aniline and from about 40 to about 60 mole percent of mixed toluidines, the total of aniline and mixed toluidines in said mixture being 100%, (2) coupling the resulting diazo product under conventional conditions to beta-naphthol, (3) heating the coupling mixture rapidly to from 90 to 102° C. with agitation, (4) cooling the coupling mixture quickly to below 85° C., and (5) isolating the granular dye product.

2. The process for preparing a granular-form, oil-soluble orange dye which comprises the steps of (1) diazotizing a mixture composed of about 50 mole percent each of aniline and mixed toluidines, (2) coupling the resulting diazo product under conventional conditions to beta-naphthol, (3) heating the coupling mixture rapidly to 100–102° C. with agitation, (4) cooling the coupling mixture quickly to 80–85° C., and (5) isolating the granular dye product.

3. An oil-soluble dye composition composed of a mixture of compounds of the following formulae:

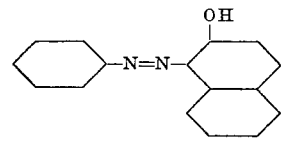

and

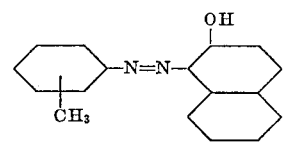

the proportion of each compound in said mixture being from about 40 to about 60 mole percent and the total of the two compounds being 100 percent.

4. The composition of claim 3 wherein the proportion of each compound is about 50 mole percent.

References Cited

UNITED STATES PATENTS

| 1,655,233 | 1/1928 | Penny | 260—197 |
| 2,181,800 | 11/1939 | Crossley | 260—197 |
| 3,004,821 | 10/1961 | Gano | 8—26 |
| 3,049,533 | 10/1962 | Spitzer et al. | 260—197 |

DAVID LEVY, *Primary Examiner.*

NORMAN G. TORCHIN, *Examiner.*